United States Patent
Faguer et al.

(10) Patent No.: US 10,717,216 B2
(45) Date of Patent: Jul. 21, 2020

(54) INSERT DESIGNED TO BE FITTED ON A SUPPORT AND FIXING ASSEMBLY INCLUDING ONE SUCH INSERT

(71) Applicant: BOLLHOFF OTALU S.A., La Ravoire (FR)

(72) Inventors: Sylvain Faguer, Arbin (FR);
Emmanuelle Berlire, Challes-les-Eaux (FR); Frédéric Bovagnet, Novalaise (FR); Jean-François Jambut, Saint Jeoire Prieuré (FR); Patrick Lejars, Barraux (FR); Raphael Basset, Sonnaz (FR)

(73) Assignee: BOLLHOFF OTALU S.A., La Ravoire (FR)

( * ) Notice: Subject to any disclaimer, the term of this patent is extended or adjusted under 35 U.S.C. 154(b) by 0 days.

(21) Appl. No.: 15/850,671

(22) Filed: Dec. 21, 2017

(65) Prior Publication Data

US 2018/0354173 A1    Dec. 13, 2018

(30) Foreign Application Priority Data

Dec. 23, 2016 (FR) ..................... 16 63278

(51) Int. Cl.
| | |
|---|---|
| *F16B 13/00* | (2006.01) |
| *B29C 45/14* | (2006.01) |
| *F16B 37/12* | (2006.01) |
| *B29C 70/68* | (2006.01) |
| *F16B 13/14* | (2006.01) |
| *B29K 705/12* | (2006.01) |

(52) U.S. Cl.
CPC .. *B29C 45/14311* (2013.01); *B29C 45/14778* (2013.01); *B29C 70/688* (2013.01); *F16B 37/122* (2013.01); *B29C 2045/14327* (2013.01); *B29K 2705/12* (2013.01); *B29K 2995/0094* (2013.01); *F16B 13/141* (2013.01); *Y10T 428/218* (2015.01); *Y10T 428/24281* (2015.01); *Y10T 428/24289* (2015.01)

(58) Field of Classification Search
CPC ......... Y10T 428/218; Y10T 428/24281; Y10T 428/24289; B29C 70/86; B29C 70/865; B29C 2045/14327; F16B 37/048; F16B 13/141
See application file for complete search history.

(56) References Cited

U.S. PATENT DOCUMENTS 3,358,727 A  *  12/1967  Hughes ................ B61D 17/043
                                                              411/180
2017/0217061 A1   8/2017  Roche et al.

FOREIGN PATENT DOCUMENTS

| EP | 2875929 A1 | 5/2015 |
|---|---|---|
| FR | 3013253 A1 | 5/2015 |
| FR | 3021899 A1 | 12/2015 |
| JP | 2013-122285 A | 6/2013 |

* cited by examiner

*Primary Examiner* — Alexander S Thomas
(74) *Attorney, Agent, or Firm* — Oliff PLC

(57) ABSTRACT

Insert designed to be fitted on a support, including a body extending along a longitudinal axis and a base including at least one plate extending along a base plane, at least one through hole oriented along an orientation axis perpendicular to the base plane being formed in said at least one plate, at least one protuberance being formed on a first surface of said at least one plate and forming a hollow on a second surface of said at least one plate.

10 Claims, 6 Drawing Sheets

INSERT DESIGNED TO BE FITTED ON A SUPPORT AND FIXING ASSEMBLY INCLUDING ONE SUCH INSERT

BACKGROUND OF THE INVENTION

The invention relates to inserts designed to be fitted on supports, and more particularly on moulded supports.

STATE OF THE ART

In general manner, an insert designed to be fitted on a moulded support, also called insert to be over-moulded, can be a nut, a rivet, a screw or a bolt, or any form depending on its function. Inserts designed for moulded supports have to be suitable to withstand tensile and shear stresses to guarantee a satisfactory strength of the mechanical connection between the support on which they are fitted and another part which is to be fixed to the insert.

Different types of inserts to be over-moulded exist. For example inserts can be cited having a body which is sunk in a thermoplastic or thermosetting resin over the whole height of their body.

In FIGS. 1 and 2, a rivet 1 of the prior art has been represented in schematic manner. In FIG. 1, a top view of the rivet 1 has been represented. In FIG. 2, a cross-sectional view of the rivet 1 included in a moulded part 3 has been represented. The rivet 1 represented in FIGS. 1 and 2 comprises a hollow body 4, such as a shank, extending along a longitudinal axis X of the rivet 1, and a base 5 welded to one end of the body 4. The base 5 is in the shape of a circular plate. The base 5 is in addition perforated, i.e. several circular through holes 6 are formed in the base 5. The circular holes 6 of the base 5 are designed to let resin fibers penetrate inside so as to create reinforcing fibers. Such a rivet 1 is integrated in the moulded part 3 by injecting a resin on the rivet 1 so as to sink the base 5 in the resin to mechanically secure the rivet 1 to the part 3 when the resin hardens. In general, the resin is a fluid material which can harden by heat effect and which is made from polyester and glass fibers. Other thermoplastic resins also exist which harden by cooling. But these rivets do not provide a sufficient strength in the injection-moulded part. In particular, when the rivet is made from a different material from that of the resin, for example a steel rivet, mechanical strength of thermosetting or thermoplastic composite materials is difficult to obtain.

French Patent application FR3013253 can be cited which discloses an insert comprising a body extending along a longitudinal axis and a base situated at one end of the body and in which several through holes are formed. The through holes are oriented in an inclined direction with respect to the longitudinal axis in order to improve the penetration of the reinforcing fibers when the resin is injected. But these inserts are intended for supports made by injection moulding of a resin. They are not suitable for supports made by heating and compression.

French Patent application FR3021899 can also be cited which discloses a plate made from a composite material with reinforcing fibers in a matrix consisting of a thermoplastic polymer, and a metal part comprising a mechanical interface to perform technical articulation functions such as a pivot link or an angular indexation. The metal part is connected to the plate and the metal interface is secured by laser welding to a tray comprising a plurality of cylindrical spikes substantially perpendicular to the tray and which penetrate into the plate. Holes with turned-out edges can further be made in the tray and form a coupling pattern which penetrates into the plate. But these inserts do not provide sufficient strength with the support.

OBJECT OF THE INVENTION

The object of the invention consists in providing an insert designed to be fitted on a support which enables the above-mentioned shortcomings to be overcome, and in particular which provides an enhanced strength of the insert on the support.

Another object consists in providing an insert suitable for thermoplastic or thermosetting supports.

According to one feature of the invention, an insert designed to be fitted on a support is proposed, comprising a body extending along a longitudinal axis and a base comprising at least one plate extending along a base plane, at least one through hole oriented in a direction perpendicular to the base plane being formed in said at least one plate.

At least one protuberance is formed on a first surface of said at least one plate and forms a hollow on a second surface of said at least one plate.

An insert is thus provided which improves its mechanical strength with the support. This insert is suitable for thermoplastic and thermosetting supports. In particular, this insert provides a better shear strength.

According to one embodiment, at least one protuberance can have a shape of a bump having an apex extending between a central part and an external edge of said at least one plate.

According to another embodiment, at least one protuberance can have a shape of a bump having an apex extending along a line surrounding the body.

The line can have an undulating shape with respect to the base plane.

According to another embodiment, at least one protuberance can have a shape of a tray extending between a central part and an external edge of said at least one plate.

According to another embodiment, at least one protuberance can have a shape of a tray extending along a line surrounding the body.

Several protuberances can be formed on the first surface of said at least one plate.

At least one protuberance can be formed on the second surface and forms a hollow on the opposite first surface, the hollow being situated between two protuberances formed on the first surface.

At least one through hole can be delimited by a truncated contour inclined at an angle, with respect to the orientation axis of said at least one through hole, comprised between 10° and 80° or comprised between 100° and 170°.

A recess can be formed in said at least one plate, and several salient elements are situated salient from a surface of the recess.

The salient elements can be spikes with a quadrilateral base.

The base can comprise several plates.

According to another feature of the invention, a fixing assembly is proposed comprising a support and an insert, as defined in the foregoing, fitted on the support.

The support can be made by moulding.

BRIEF DESCRIPTION OF THE DRAWINGS

Other advantages and features of the invention will become apparent from examination of the detailed description of non-restrictive exemplary embodiments, and of the appended drawings, in which.

DETAILED DESCRIPTION

Figure 8:
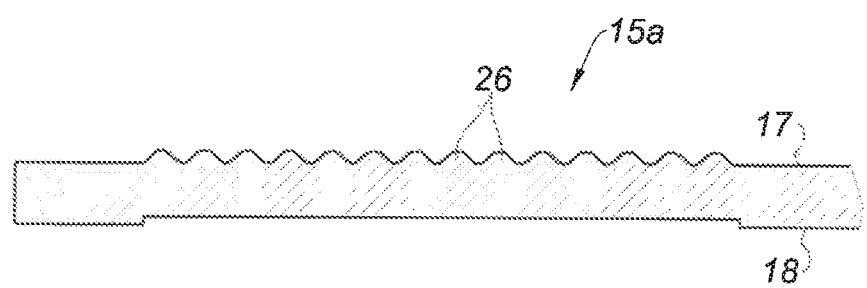
FIG. 8 schematically illustrates a cross-sectional view of another embodiment of a set of salient elements.
Figure 9:
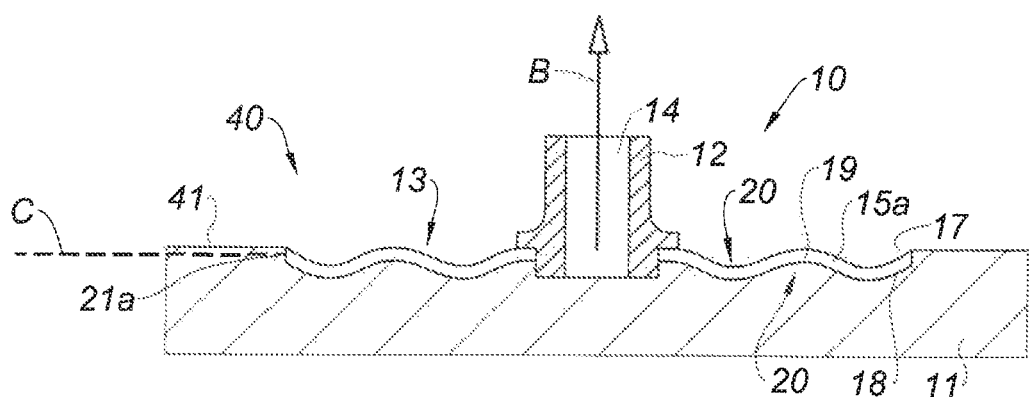
FIG. 9 schematically illustrates a cross-sectional view of a fixing assembly according to the invention.
Figure 10:
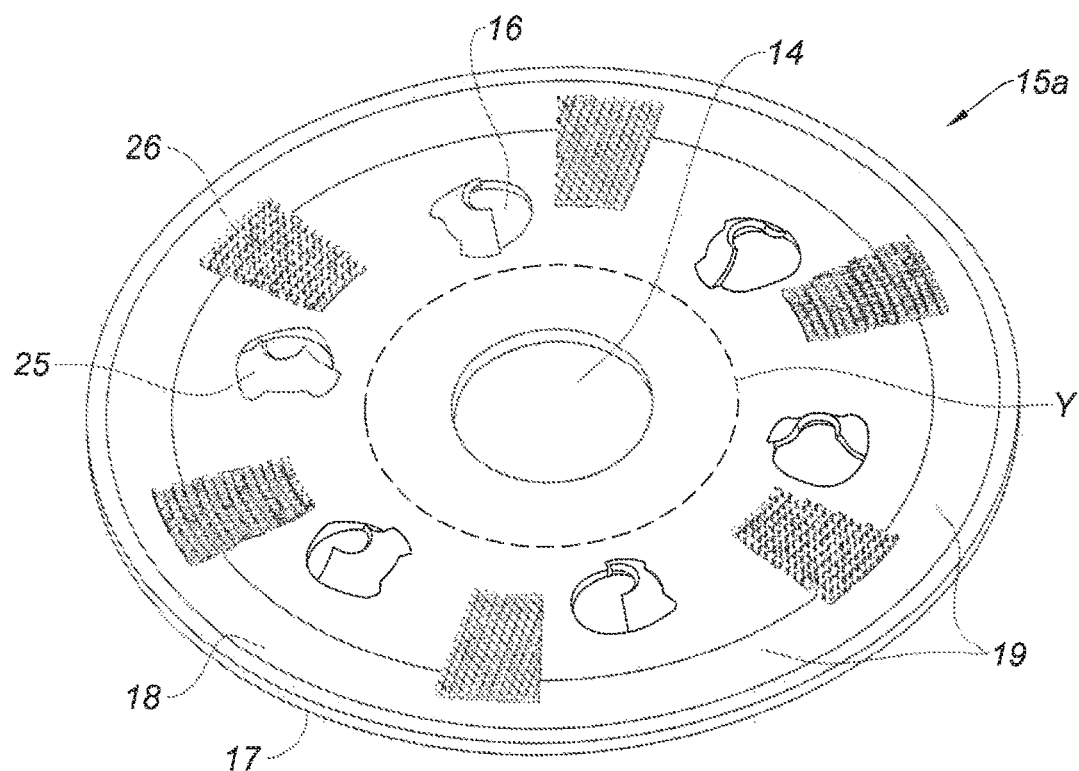
FIGS. 10 to 13 schematically illustrate perspective views of other embodiments of an insert according to the invention.
Figure 11:
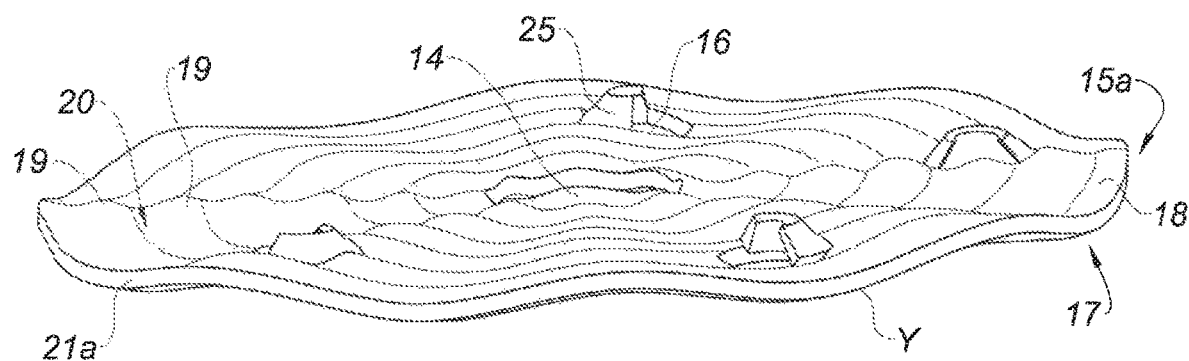

In FIGS. 3 to 12, an insert 10 designed to be fitted on a support 11 has been represented, the support being illustrated in FIG. 9. Advantageously, the insert 10 is particularly suitable for fitting on a moulded support 11.

Figure 1:
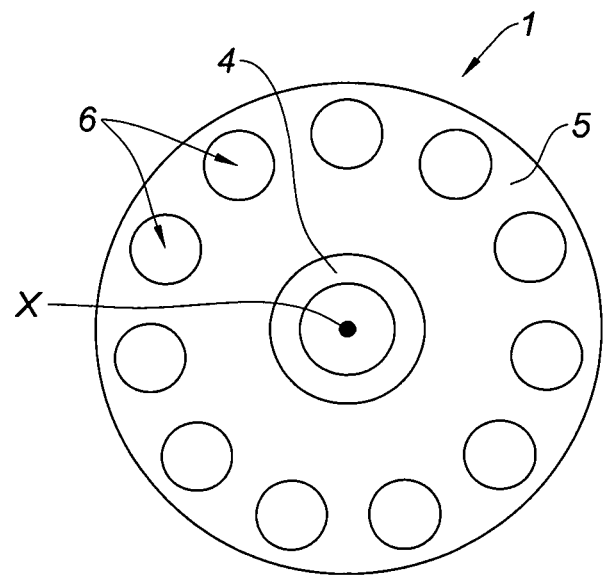
FIGS. 1 and 2 schematically illustrate two views of a rivet according to the prior art.
Figure 2:
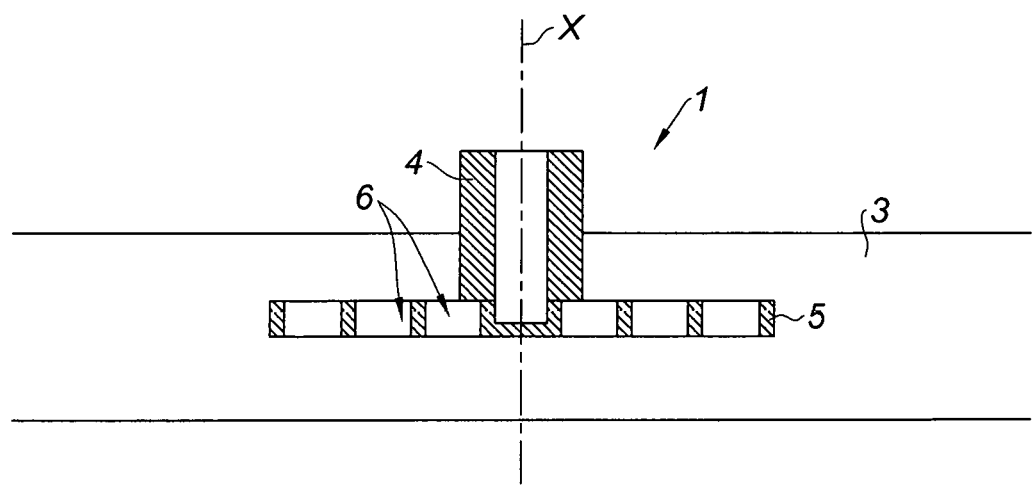
Figure 3:
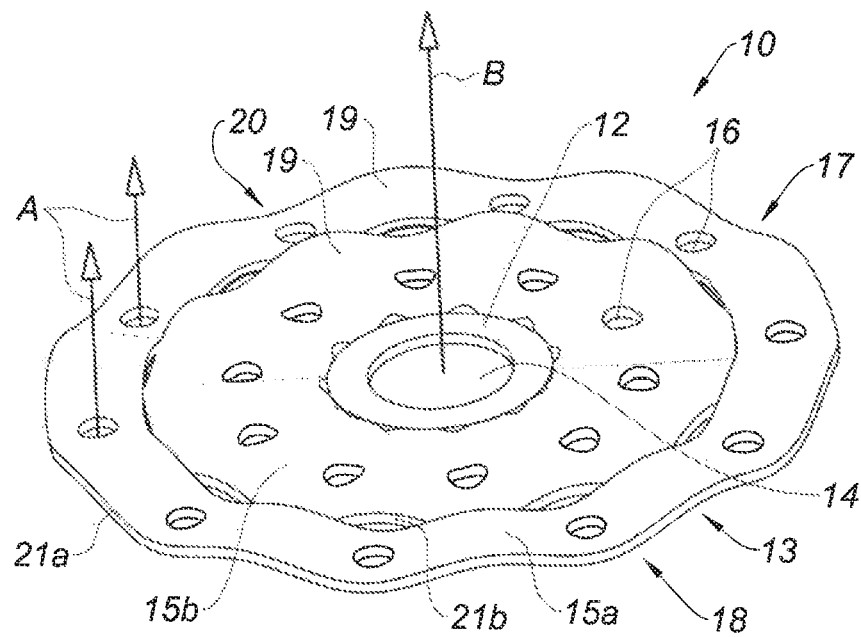
FIG. 3 schematically illustrates a perspective view of an embodiment of an insert according to the invention.
Figure 4:
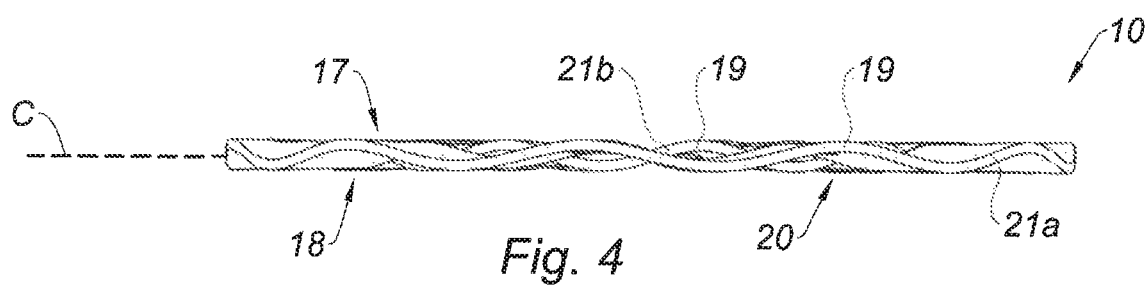
FIG. 4 schematically illustrates a perspective side view of the insert illustrated in FIG. 3.

The insert 10 can be a nut, a rivet, a screw or a bolt. A nut is a tapped hollow part, i.e. which comprises an internal threading, designed to receive another threaded part. A rivet is an element used for assembling flat parts that is swollen at one end, the other end of which is crushed. A screw or bolt is a threaded solid part, i.e. which comprises an external threading. Preferentially, the insert 10 is made from metal, for example from steel. The insert 10 comprises a body 12, such as a shank, extending along a longitudinal axis B, and a base 13 situated at one end of the body 12. The body 12 of the insert 10 has a globally cylindrical shape. What is meant here by cylinder is a solid limited by a cylindrical surface generated by a line, noted generatrix, describing a closed flat curve, noted directrix, and two planes intersecting the generatrices. The body 12 can have a height equal to the thickness of the base 13, as illustrated in FIG. 3. As a variant, the body 12 extends salient from the base 13, as illustrated in FIG. 9. Preferably the body 12 has the shape of a hollow cylinder delimiting a through or blind hole 14.

The base 13 comprises at least one plate 15a, 15b in which at least one through hole 16 is formed. Preferentially, the base 13 comprises a single plate 15a. As a variant, the base 13 comprises two or more plates 15a, 15b. In FIG. 3, an example has been represented in which an insert 10 has a first plate 15a and a second plate 15b surrounding the first plate 15. For example, the plates 15a, 15 are joined to one another by welding. As a variant, the base 13 can comprise several superposed plates 15a, 15b. Each plate 15a, 15b extends along a base plane C. The base plane C corresponds to a plane perpendicular to the plane of the sheet of FIGS. 4, 5 and 9. Each plate 15a, 15b further presents a first surface 17 and a second surface 18 opposite the first surface 17.

Figure 5:
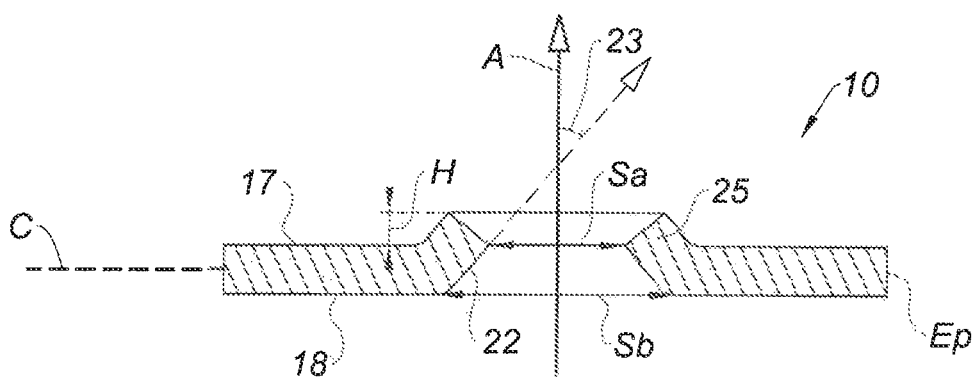
FIG. 5 schematically illustrates a cross-sectional view of an embodiment of a truncated contour.

In general manner, the through holes 16 are oriented along respective axis A, noted orientation axis. In other words, the through holes 16 each have an orientation axis A which passes through the hole 16. A through hole further comprises a first end situated at the level of the first surface 17 and having a section Sa, noted opening section, and a second end situated at the level of the second surface 18 and having a section Sb, noted base section. More particularly, the orientation axis A of a through hole 16 is perpendicular with respect to the base section Sb of the hole 16, as illustrated in FIG. 5. Preferentially, the orientation axis A of the through holes 16 are perpendicular to the base plane C of each of the plates 15, 15b. That is to say that the section Sa, Sb of at least one end of a through hole 16 is located in a plane parallel to the base plane C of the plate 15a, 15b. For example, the orientation axis A can be parallel to the longitudinal axis B, which makes them easy to achieve. As a variant, the orientation axis A are parallel to one another and inclined at an angle from the longitudinal axis B. Such a plate 15a, 15b enables the strength of the insert 10 to be enhanced when the latter is fitted on a moulded support 11. In this case, reinforcement lines are introduced in the through holes 16 and increase the shear strength of the insert 10. Advantageously, an odd number of through holes 16 are formed in the plate 15a, 15b to create a dissymmetry with respect to the centre of the insert 10 and to provide a greater folding resistance. Preferentially, the insert 10 is made from metal, for example from steel. As a variant, the body 12 and plates 15a, 15b can be made from the same material or from two different materials. According to another variant, the insert 10 comprises several bodies 12, each body 12 performing a function of securing a part to the support 11. The plate 15a, 15b has a part of its second surface 18 filled with material which is greater than the sum of the base surfaces Sb of the through holes 16. A substantial contact between the part filled with material and the support 11 is thereby guaranteed.

The support 11 can be thermoplastic or thermosetting. For example the support 11 can be made from a plastic or composite material. Preferably, the support 11 is formed by moulding. A thermoplastic support is made from a material that is malleable under the effect of heat. A thermosetting support is for its part made from a resinous material which is made to lose its plasticity by extended heating. The support can be moulded by injection of a thermosetting resin. Advantageously, the hollow insert 10 is blind to prevent the resin from penetrating into the inside of the body 12. As a variant, it can be produced by heating thermoplastic strips which can soften due to the effect of heat. It can also be made by compression and baking of thermosetting strips which liquefy on the plate 15a, 15b of the insert 10. The insert 10 is generally placed in a mould designed to receive a thermoplastic or thermosetting material to manufacture the support 11 and to fit the insert 10 on the support 11. A fixing assembly 40 is thus obtained comprising the insert 10 fitted on the support 11. Optionally, the support 11 can comprise a part made from strengthening fabric, for example a part provided with glass fibers, or carbon fibers, or aramid fibers, or a mixture of the three, or with metal wires or even vegetal fibers. The part made from fabric can be woven or knitted on a voile to locally reinforce the support 11. The part made from fabric can be fixed on the insert 10 during moulding.

The insert 10 is particularly suitable to be fitted on a support 11 so that a surface 41 of the support 11, situated around the insert 11, does not protrude beyond the first surface 17 of the plate 15a. In other words, the first surface 17 of the plate 15a can remain visible once the insert 10 has been fitted on the support 11. In this case, the insert 10 withstands most of the mechanical stresses. As a variant, the plate 15a is sunk in the support 11. In this case, the first surface 17 is not visible. The adherence between the insert 10 and support 11 is then enhanced.

Figure 6:
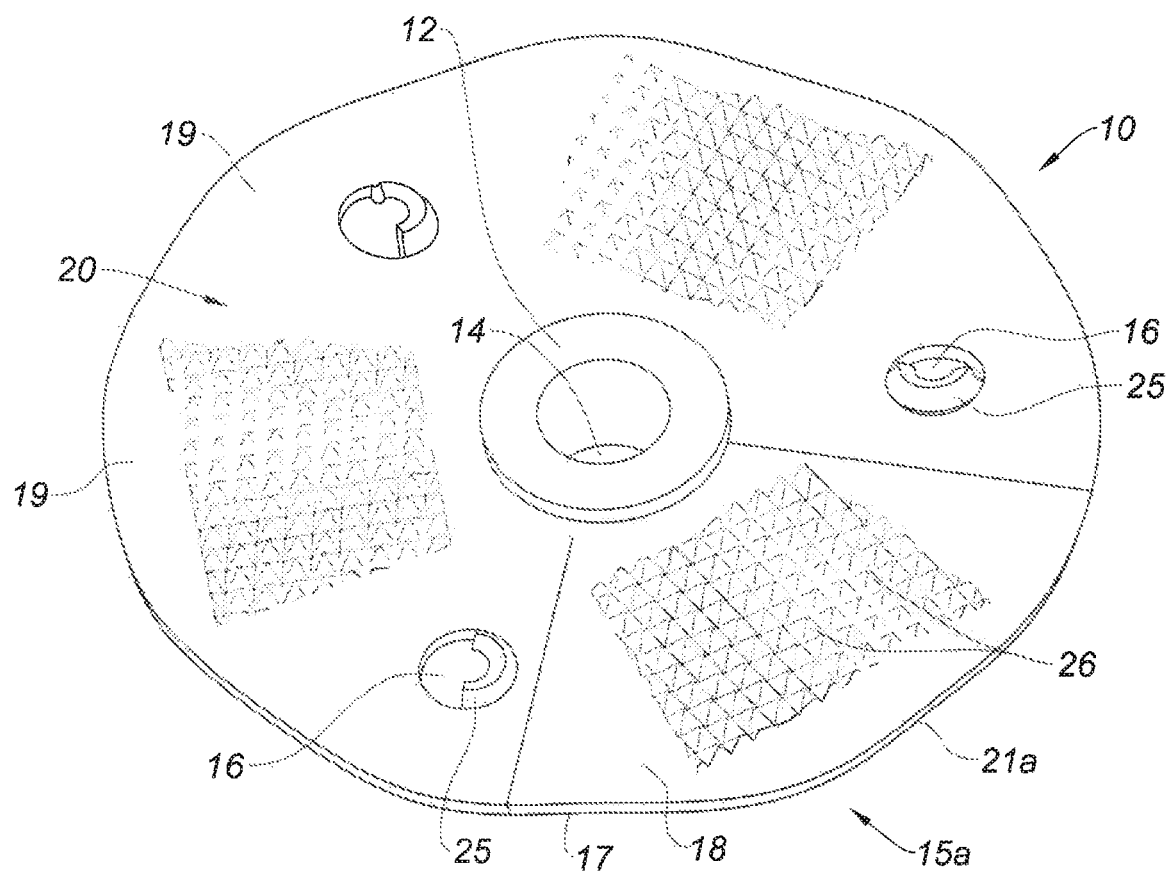
FIG. 6 schematically illustrates a perspective view from below of another embodiment of an insert according to the invention.
Figure 7:
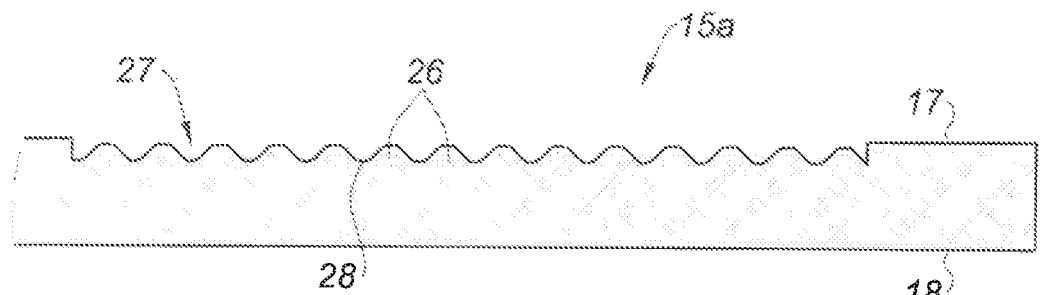
FIG. 7 schematically illustrates a cross-sectional view of an embodiment of a set of salient elements.

More particularly, at least one protuberance 19 is formed on a first surface 17, 18 of the plate 15a, 15b. Several protuberances 19 can be formed on a surface 17, 18 of the plate 15a, 15b. Furthermore, each protuberance 19 forms a hollow 20 on the opposite second surface 18, 17 of the plate 15a, 15b. For example, at least one protuberance 19 has a form of a bump, as illustrated in FIGS. 3, 6, 10 and 11. What is meant by bump is a rounded protuberance 19. The plate 15a, 15b is then said to have an undulating shape. This means that the plate 15a, 15b comprises a first surface 17 comprising a plurality of bumps 19 forming hollows 20 situated on the second surface 18 of the plate 15a, 15b. Inversely, the second surface 18 of the plate 15a, 15b comprises a plurality of bumps 19 forming hollows 20 situated on the opposite first surface 17. In particular, each hollow 20 situated on a surface 17, 18 is further situated between two bumps 19 formed on the same surface 17, 18. The bumps 19 form waves on a surface 17, 18 of the plate 15a, 15b. For example, the plate 15a, 15b comprises a first surface 17, 18 on which bumps 19 and hollows 20 are formed. For example, as illustrated in FIGS. 3 and 6, the bumps 19 each have an apex extending between a central part of the plate 15a, 15b and an external edge 21a, 21b situated at the periphery of the plate 15a, 15b. In FIG. 3, a first plate 15b the central part of which corresponds to the body 12 of the insert 10, and a second plate 15a the central part of which corresponds to an internal edge surrounding and joining the external edge 21b of the first plate 15b, have been represented. As a variant, the bumps 19 each have an apex extending along a line Y surrounding the body 12 of the insert. For example purposes, a plate 15a comprising a single bump 19 has been represented in FIG. 10. For example, the line Y can be a circle the centre of which corresponds to that of the body 12 of the insert 10. According to another example illustrated in FIG. 11, the line Y has an undulating shape with respect to the base plane C.

Figure 12:
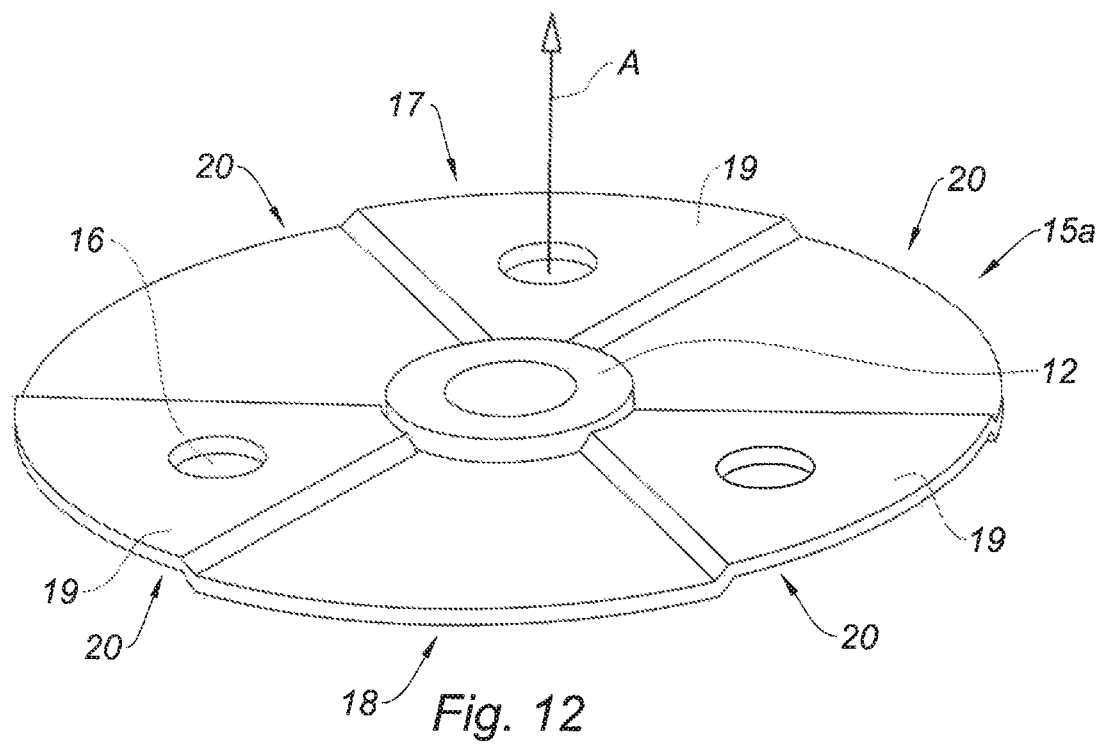

According to another variant, at least one protuberance 19 has the form of a tray, as illustrated in FIG. 12. What is meant by tray is a protuberance 19 which presents a flat part joining two angular edges, or two inclined edges with an angular difference with respect to the flat part. In other words the plate 15a comprises a first surface 17 comprising a plurality of trays 19 forming hollows 20 situated on the second surface 18 of the plate 15a. As illustrated in FIG. 12, the first surface 17 comprises three trays. Inversely, the second surface 18 of the plate 15a comprises a plurality of trays 19 forming hollows 20 situated on the opposite first surface 17. In particular, each hollow 20, situated on a surface 17, 18 is furthermore situated between two trays 19 formed on the same surface 17, 18. As illustrated in FIG. 12, the trays 19 each extend between the central part of the plate 15a and the external edge 21a of the plate 15a. As a variant, the trays 19 each extend along a line Y surrounding the body 12 of the insert.

The protuberances 19 enhance the rigidity of the plate 15a, 15b in comparison with the same flat plate. The protuberances 19 furthermore increase the contact surface of the insert 10 with the support 11, which enhances the resistance to tensile, compressive, or shear stresses. In other words, the insert 10 accompanies the strains of the support 11, i.e. it maintains an adherence with the support 11 when mechanical compressive, tensile and shear strains occur.

The external edge 21a, 21b of the plate 15a, 15b can be of various shapes, such as for example circular, rectangular, square, star-shaped etc. Furthermore, the external edge 21a, 21b can be limited by a clear cut-off perpendicular to the surfaces 17, 18 of the plate 15a, 15b. According to another example, the external edge 21a, 21b is terminated by an edge that is curved with respect to one of the surfaces 17, 18, i.e. curved with respect to the base plane C.

In general manner, a through hole 16 is delimited by a contour 22 formed in the plate 15a, 15b. The contour 22 is formed for example by drilling the through hole 16 in the plate 15a, 15b. The contour 22 preferentially has a truncated shape inclined at an angle 23 comprised between 10° and 80° or comprised between 100° and 170° with respect to the orientation axis A of the through hole 22. What is meant by cone is a surface generated by a movable line, called generatrix, passing through a fixed point, called apex, and moving along a closed curve, called directrix. The base section Sb is delimited by the directrix. The cone can be truncated and a cone is said to be truncated when its surface does not extend up to its apex. Preferably, the angle 23 is equal to 80°. The base section Sb of the through hole 16 can be circular or in the form of a half-moon as illustrated in FIG. 6. For example, as illustrated in FIG. 6, a part of the contour 22 is truncated and the other part is flat.

A through hole 16 can be delimited by an extension 25 extending salient from a surface 17, 18 of the plate 15a, 15b. The extension 25 can have an internal contour 22 as defined in the foregoing. The extension 25 is formed for example by drilling the through hole 16 in the plate 15a, 15b while creating the extension 25 salient from one surface 17, 18. The extension 25 has a height H, with respect to the surface 17, 18 from which it is salient, comprised between half the thickness Ep of the plate 15a, 15b and twice the thickness Ep of the plate 15a, 15b. Preferably, the extension 25 has a height H equal to 0.7 times the thickness of the plate 15a, 15b. The height H corresponds to the distance between the surface 17, 18, from which it is salient, and the end of the extension 25. The end of the extension 25 delimits the opening section Sa. More particularly, for a through hole 16, the ratio between the opening section Sa and the base section Sb is comprised between 0.3 and 0.9. The ratio Sa/Sb is preferably equal to 0.6.

Such extensions 25 enable the contact surface between the plate 15a, 15b and support 11 to be increased, which enhances the adherence between the insert 10 and support 11.

Figure 13:
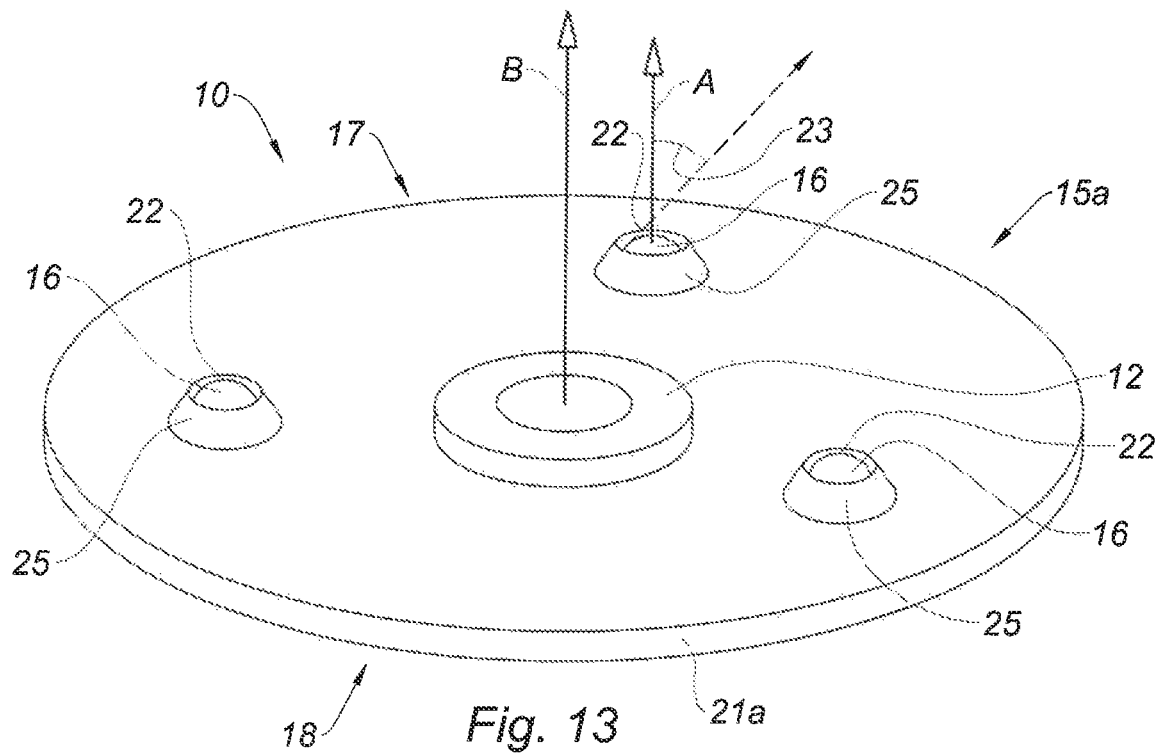

In FIG. 13, an embodiment of an insert 10 designed to be fitted on a support 11 has been represented. The insert 10 comprises a body 12 extending along a longitudinal axis B and a base 13 comprising at least one plate 15a extending along a base plane C. At least one through hole 16 oriented along an orientation axis A perpendicular to the base plane C is formed in said at least one plate 15a. At least one through hole 16 is delimited by a truncated contour 22 inclined at an angle 23, with respect to the orientation axis A of said at least one through hole 16, comprised between 10° and 80° or comprised between 100° and 170°. Further, said at least one plate 15a presents a first surface 17 and a second surface 18 opposite the first surface 17. For example, as illustrated in FIG. 13, the insert 10 comprises one flat plate 15a. In other terms, surfaces 17, 18 of the plate 15a are flat.

The plate 15a, 15b can comprise several salient elements 26 to increase the contact surface between the insert 10 and support 11, thereby enhancing the adherence of the insert 10 with the support 11. In particular the salient elements 26 enable the shear strength and sliding resistance to be increased. The salient elements 26 distribute the stress over the surface 17, 18 of the plate 15a, 15b.

For example, the salient elements 26 are spikes with a quadrilateral base. The base can be square, rectangular, rhomboid, or in the form of a parallelogram. Preferably, the height of the spike is comprised between 0.3 times T and 0.5 times T, where T corresponds to the smaller diagonal of the quadrilateral base. The length ratio Q between half of the larger diagonal and an edge joining the apex of the spike is comprised between 0.6 and 0.8. Preferably, the angle between an edge and the plane of the quadrilateral base is equal to 75°, which gives the insert 10 an enhanced sliding resistance. Furthermore, when the quadrilateral base is a rhomb, the sides of the base are preferably inclined by 30° with respect to the larger diagonal of the quadrilateral base. The salient elements 26 can be produced by material push-outs or by moulding. Preferably, a recess 27 is formed in the plate 15a, 15b. As a variant, several recesses 27 are formed in the plate 15a, 15b. A recess 27 is delimited by a surface 28 located laid back from the surface 17, 18 of the plate 15a, 15b. Furthermore, several salient elements 26 can be situated salient from the surface 28 of a recess 27.

As a variant, as illustrated in FIG. 8, the salient elements 26 are situated salient from the surface 17 of the plate 15a.

The insert which has just been described enables the mechanical strength of the insert fitted on a support to be enhanced. Such an insert enables a part to be fitted on a support made from a thermosetting or thermoplastic material. The insert is particularly suitable for the automobile industry and can also be used in the naval sector or in the aeronautical field.

The invention claimed is:

1. An insert designed to be fitted on a support, comprising a body extending along a longitudinal axis and a base comprising at least one plate extending along a base plane, at least one through hole oriented along an orientation axis perpendicular to the base plane being formed in said at least one plate, and at least one protuberance being formed on a first surface of said at least one plate and forms a hollow on a second surface of said at least one plate, wherein at least one protuberance has the form of a tray extending from a central edge to an external edge of said at least one plate.

2. The insert according to claim 1, wherein at least one protuberance has the form of a tray extending along a line surrounding the body.

3. The insert according to claim 1, wherein several protuberances are formed on the first surface of said at least one plate.

4. The insert according to claim 3, wherein at least one protuberance is formed on the second surface and forms a hollow on the opposite first surface, the hollow being situated between two protuberances formed on the first surface.

5. The insert according to claim 1, wherein at least one through hole is delimited by a truncated contour inclined at an angle with respect to the orientation axis of said at least one through hole comprised between 10° and 80° or comprised between 100° and 170°.

6. The insert according to claim 1, wherein a recess is formed in said at least one plate and several salient elements are situated salient from a surface of the recess.

7. The insert according to claim 6, wherein the salient elements are spikes with a quadrilateral base.

8. The insert according to claim 1, wherein the base comprises several plates.

9. A fixing assembly comprising a support and the insert according to claim 1, fitted on the support.

10. The fixing assembly according to claim 9, wherein the support is made by moulding.

* * * * *